United States Patent [19]
Parker

[11] 3,769,959

[45] Nov. 6, 1973

[54] HEATING TUBE AND BAFFLE FOR DEEP FAT FRYERS

[75] Inventor: James W. Parker, Chicago, Ill.

[73] Assignee: Chicken Unlimited, Inc., Chicago, Ill.

[22] Filed: Mar. 2, 1972

[21] Appl. No.: 231,226

[52] U.S. Cl. .................. 126/91, 165/109, 165/185, 138/38
[51] Int. Cl. ............................................. F28f 7/00
[58] Field of Search ..................... 126/91 A, 99 A; 165/109 T, 179, 185; 138/38

[56] References Cited
UNITED STATES PATENTS

| | | |
|---|---|---|
| 2,655,944 | 10/1953 | Proehl .......................... 126/91 A |
| 2,688,986 | 9/1954 | O'Brien ........................ 165/109 T |
| 2,852,042 | 9/1958 | Lynn ............................. 165/109 |

Primary Examiner—Charles Sukalo
Attorney—Johnston, Root, O'Keefe, Keil, Thompson & Shurtleff

[57] ABSTRACT

The invention is directed to an improved heating tube for deep fat fryers and particularly to a baffle which is inserted in the heating tube, said baffle consisting of an elongated strip of metal having projections struck out from alternate sides of the strip, said projections being placed at varying angles from the strip depending upon the distance between each projection and the point at which a flame enters the heating tube.

5 Claims, 4 Drawing Figures

PATENTED NOV 6 1973　　3,769,959

HEATING TUBE AND BAFFLE FOR DEEP FAT FRYERS

BACKGROUND OF THE INVENTION

This invention is directed to an improved heating tube for deep fat fryers and to a removable baffle for said heating tube, said baffle including oppositely disposed and angularly arranged projections.

Restaurants, hospitals, and other establishments which regularly prepare fried foods such as fried chicken and the like, use deep fat fryers which hold substantial volumes of melted fat or oil. The fat or oil is maintained at a temperature on the order of 375°–430°F. The volume of fat or oil held in the fryer is considerably larger than the volume of material to be fried. Such a large volume is needed to prevent excessive chilling of the heated fat or oil when frozen or cold articles such as chicken parts are placed in the fryer.

Because of the large volume of oil or fat used in such fryers it is important to have a highly efficient means to heat the fat or oil and to replace the heat that is used up during the frying operation. It is customary to heat the fat or oil by means of a gas flame or flames which contact horizontal heat exchanger or combustion tubes within the fryer tank. Heat energy is passed from the flame to the walls of the tubes and then to the oil or fat in the cooking vessel.

In tubular heat exchangers there is a tendency for the heat from the flame to pass through the tube and to be lost with the exhaust gases up the flues or stacks of the heating system. To prevent this heat loss devices such as heating grids, baffles and the like have been added to the tubes. These are designed to break up and radially deflect the flame to effect a more efficient transfer of heat from the heat exchanger to the heated medium. There is also a tendency for the heated gases within the heating tube to form a concentric series of films or laminae from the core to the inner circumference of the tube. These concentric films or laminae tend to move successively slower from the core outwardly to the circumference where the film or laminae in frictional contact with the inner surface of the tube wall mvoes the slowest. Under such conditions, heat transfer between the heat exchanger and the medium to be heated is not optimal. To break up the films or laminae which form in the tubes, it has been common practice to incorporate in the tubes some kind of baffle.

The construction of such baffles and other devices has assumed a variety of patterns in an attempt to obtain more efficient heat transfer. Despite the use of such baffles, the prior art devices have not been entirely successful. Uniform heating of the fat or oil has been difficult to maintain, particularly where the baffle or deflector is welded to the heat tube thereby forming points of double insulation. Additionally, certain of the heating tubes suffer from burn-out which necessitates the replacement of the entire tube. The formation of excessive amounts of carbon monoxide gas is also a problem with certain prior art devices.

OBJECTS OF THE INVENTION

One of the primary objects of the present invention is to provide a more efficient heat transfer means for deep fat fryers. A further object of the invention is to provide a baffle of a type which is easily manufactured from strip material and which may be conveniently inserted and removed from heat exchanger tubes. A still further object of the invention is to provide a baffle having projections alternately formed from the sides of the strip, which projections may be punched, stamped, or otherwise bent outwardly from the strip itself. A further object of the invention is to provide a heat exchanger which improves the heat efficiency of the heating tube and yet does not produce undue amounts of carbon monoxide gas. Other objects will become apparent to those skilled in the art from the following detailed description of the invention.

SUMMARY OF THE INVENTION

In general, the present invention consists of an improved heating tube and heat exchanger for use in a deep fat fryer. The heat exchanger includes a baffle comprising an elongated strip of heat resistant metal having a series of oppositely disposed, angularly arranged tabs or deflectors. Each of the tabs is arranged at a predetermined angle with respect to the strip. The angle formed between the tabs and the strip varies with the distance between the tab and the end of the heat exchange tube. The angles are selected to provide maximum heat transfer to the heating medium while causing a minimum formation of carbon monoxide gas.

DESCRIPTION OF THE PREFERRED EMBODIMENTS

Figure 1:
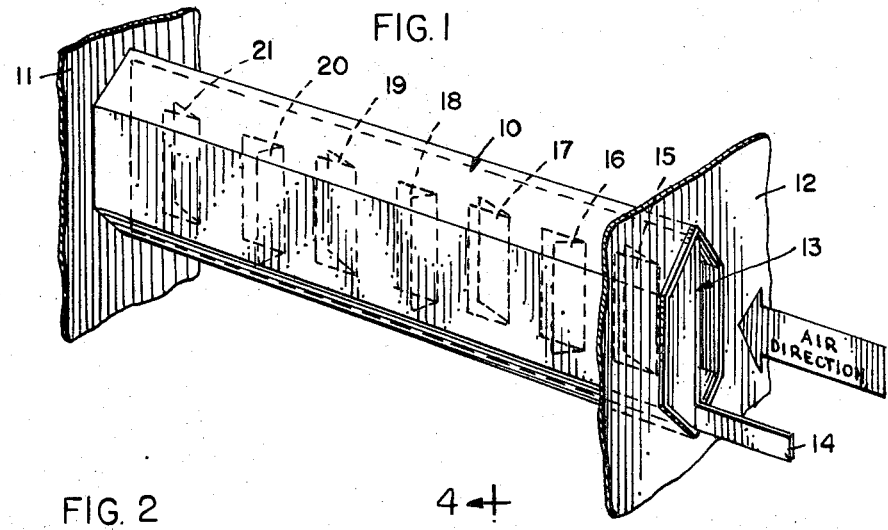
FIG. 1 is a perspective view of a heating tube containing the subject baffle.

In FIG. 1 heating tube 10 is shown positioned between walls 11 and 12 of a suitable heating tank or vessel. During operation the vessel contains cooking or frying fat or oil. It is to be understood that the number of tubes will vary depending upon the size of the vessel. In one embodiment five tubes are placed on a horizontal plane in each tank or vessel. A baffle 13 is removably positioned within the tube 10. A handle 14 is attached to or forms a part of the baffle 13. The handle is at the gage end of the tube. The handle can be calibrated so as to regulate the distance between the opening of the tube and the first tab or projection 15 of the baffle. The baffle includes a series of such projections (15–21) which are spaced at various distances from the opening of the tube. As is evident from FIG. 3, the angle between a projection and the baffle strip increases as the distance from the tube opening to the projection increases. The number of such projections depends largely on the length of the heating tube and the baffle. One of the advantages of the subject device lies in the fact that the baffle is removable. In case of a burn-out a new baffle can be inserted in the tube without difficulty and without great expense.

Figure 2:
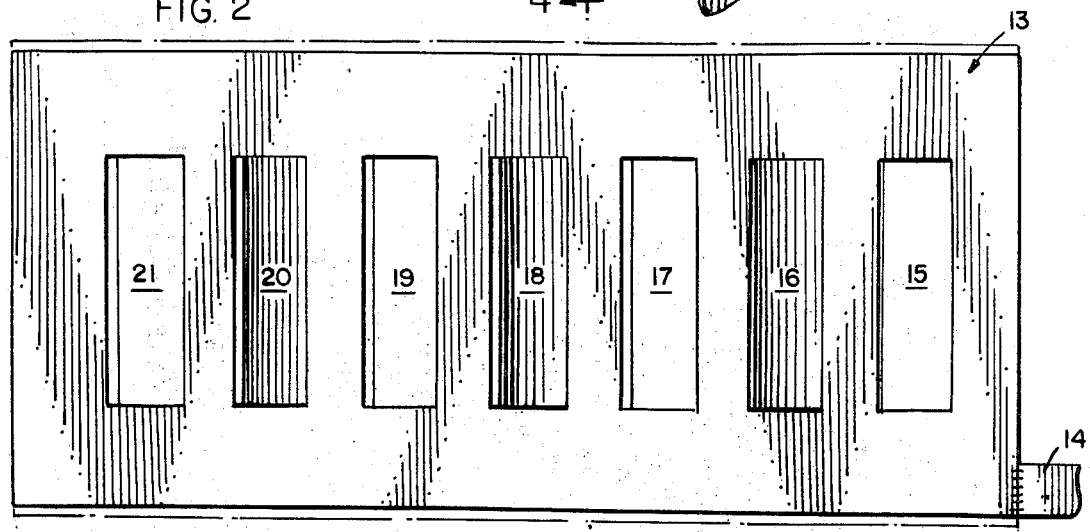
FIG. 2 is a side view of the subject baffle.

FIG. 2 is a side view of the baffle. Projections 15–21 are struck from the baffle strip. The distance between the projections is approximately equal and in one commercial embodiment is about 5/16 inches. In the same embodiment the projections are from ¾ inches to ⅞ inches wide and 2 ⅝ inches from top to bottom, while the length of the baffle is 9 ¾ inches and its height is 4 ⅝ inches.

Figure 3:
FIG. 3 is a top plan view of the baffle.

FIG. 3 is a top plan view of the baffle of FIG. 2. The angle between baffle 13 and projection 15 is 10°. The angle between projection 16 and baffle 13 is 13°. The angle between projection 17 and the baffle is 20°. The angle between projection 18 and the baffle is 24°. The angle between projection 19 and the baffle is 28°. The angle between projection 20 and the baffle is 32°, and the angle between projection 21 and the baffle is 38°. The angles of the individual projections can be varied up to plus or minus 3° and, preferably, the variation from the stated amount should not be greater than plus or minus 1°.

Figure 4:
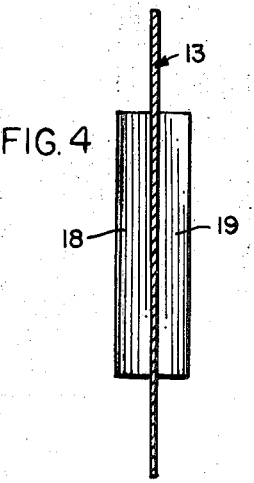
FIG. 4 is a sectional view taken along lines 4—4 of FIG. 2.

FIG. 4 is a sectional view taken along lines 4—4 of FIG. 2. The strip of baffle 13 is shown, as well as projections 18 and 19.

As was pointed out previously, gas burners are conventionally used to heat the fat or oil in the tank. It has been found that the use of two small gas burners per heating tube is satisfactory for most purposes. The baffle strip 13 splits the flames of the burners and the projections deflect the flames outwardly toward the walls of the tubes. If 75 pounds of shortening oil is placed in the fryer, 10 burners, each with a capacity of 14,070 btu's can be employed. This provides a total of 140,700 btu input into the cooker.

Both the baffle and the heating tube can be made of heat resistant metal such as Nichrome steel. Because there are no weld points between the baffle and the tube, no metal burnout is experienced with the subject device. A lack of weld points also promotes uniform heating of the fat or oil. Although most of the heating tubes are hexagonal or oval, a wide variety of tube shapes can be used with the subject baffle. Many of the tubes used in commercial establishments are about 16 inches in length.

I claim:

1. A heat exchanger for use in a deep fat fryer which comprises in combination: a metal combustion chamber and a flame-deflecting baffle removably positioned with said chamber, said baffle including an elongated metal strip and a series of oppositely disposed and angularly arranged metal deflectors extending from said strip, said deflectors forming an angle with said strip which becomes progressively larger as the distance between the deflector and the inlet opening of said combustion chamber increases.

2. A heat exchanger as in claim 1 wherein said baffle includes an elongated handle for positioning said baffle within said combustion chamber.

3. A heat exchanger as in claim 1 wherein said baffle includes at least seven deflectors arranged on alternate sides of the elongated metal strip of the baffle, and wherein the angle between the deflector closest to the inlet opening of the combustion chamber and said metal strip is from 7° to 13°, the angle between the second deflector and the metal strip is from 10° to 16°, the angle between the third deflector and the metal strip is from 17° to 23°, the angle between the fourth deflector and the metal strip is from 21° to 27°, the angle between the fifth deflector and the metal strip is from 25° to 31°, the angle between the sixth deflector and the metal strip is from 29° to 35°, and the angle between the seventh deflector and the metal strip is from 35° to 41°.

4. A heat exchanger as in claim 3 wherein the angle between the deflector closest to the inlet opening of the combustion chamber and said metal strip is from 9° to 11°, the angle between the second deflector and the metal strip is from 12° to 14°, the angle between the third deflector and the metal strip is from 19° to 21°, the angle between the fourth deflector and the metal strip is from 23° to 25°, the angle between the fifth deflector and the metal strip is from 27° to 29°, the angle between the sixth deflector and the metal strip is from 31° to 33°, and the angle between the seventh deflector and the metal strip is from 37° to 39°.

5. A heat exchanger as in claim 2 wherein said handle is calibrated whereby the distance between the opening of said chamber and the first deflector of said strip can be accurately regulated.

* * * * *